United States Patent
Drake

(10) Patent No.: US 7,337,750 B2
(45) Date of Patent: Mar. 4, 2008

(54) ANIMAL DETERRENT DEVICE

(75) Inventor: Robert L. Drake, 7820 Larry Dr., Fairburn, GA (US) 30213

(73) Assignee: Robert L. Drake, Fairburn, GA (US)

( * ) Notice: Subject to any disclaimer, the term of this patent is extended or adjusted under 35 U.S.C. 154(b) by 0 days.

(21) Appl. No.: 11/187,782

(22) Filed: Jul. 20, 2005

(65) Prior Publication Data

US 2006/0096519 A1 May 11, 2006

Related U.S. Application Data

(60) Provisional application No. 60/609,233, filed on Nov. 5, 2004.

(51) Int. Cl.
*A01K 15/00* (2006.01)
*A01M 29/02* (2006.01)

(52) U.S. Cl. ..................................... 119/712; 116/22 A

(58) Field of Classification Search ................. 119/712, 119/713, 718, 719, 702, 707; 43/1, 16, 17; 116/200, 202, 203, 278, 22 A
See application file for complete search history.

(56) References Cited

U.S. PATENT DOCUMENTS

| | | | |
|---|---|---|---|
| 3,602,790 A * | 8/1971 | Kearns | 318/443 |
| 3,610,781 A * | 10/1971 | Kolb et al. | 417/319 |
| 3,733,913 A * | 5/1973 | Schneider et al. | 74/78 |
| 3,749,902 A * | 7/1973 | Drew | 362/106 |
| 4,597,357 A | 7/1986 | LeMessurier | |
| 4,598,660 A * | 7/1986 | Konzak | 116/22 A |
| 5,009,192 A | 4/1991 | Burman | |
| 5,277,516 A | 1/1994 | Strieter | |
| 5,320,446 A | 6/1994 | Strieter | |
| 5,450,063 A * | 9/1995 | Peterson et al. | 340/573.2 |
| 5,458,093 A | 10/1995 | MacMillan | |
| 5,602,523 A | 2/1997 | Turchioe et al. | |
| 5,892,446 A | 4/1999 | Reich | |
| 6,211,779 B1 * | 4/2001 | Gibb et al. | 340/466 |
| 6,351,908 B1 * | 3/2002 | Thomas | 43/1 |
| 6,556,148 B2 * | 4/2003 | Ellis | 340/990 |

FOREIGN PATENT DOCUMENTS

CA 2106276 3/1994

* cited by examiner

*Primary Examiner*—Son T. Nguyen
(74) *Attorney, Agent, or Firm*—Alston & Bird LLP

(57) ABSTRACT

An animal deterrent device design to prevent animals from intruding into gardens, fields, yards, etc., which comprises a light source illuminating a flag or other signaling device, designed to be moved in an irregular fashion by a motor when a timer activates and the light source and the motor. The irregular motion of the flag, further enhanced by the illumination from the light will drive off animals without injury and the timer will deactivate after a brief interval.

3 Claims, 7 Drawing Sheets

ANIMAL DETERRENT DEVICE

CROSS-REFERENCE TO RELATED APPLICATIONS

This application also claims priority benefits under 35 U.S.C. §119(e) to U.S. Provisional Application no. 60/609,233 filed Nov. 05, 2004 naming as inventor Robert L. Drake, which is hereby incorporated by reference.

FIELD OF THE INVENTION

The present invention relates to an apparatus for deterring animals from a area to be protected from damage. More specifically, the apparatus generates light, motion, sound, or a combination of the same, in order to drive away animals from the protected area. The apparatus can be used to deter animals from consuming or destroying plantings or crops, or for other purposes.

BACKGROUND OF THE INVENTION

Wildlife can cause considerable damage as they enter and feed in fields, yards, and gardens. Much of this feeding is done in the hours between dusk and dawn. Fences have been used to keep such animals at bay. However, fences used to exclude deer and other large animals must be extremely high and sturdy, or electrified. Such fences are generally complicated and troublesome to assemble, require significant time and expense to build, and can be unsightly or not in keeping with aesthetic objectives for the property. Therefore, it would be desirable to provide an alternative solution to fencing.

Various electronic devices that are activated by infra-red heat and motion sensors have been developed, but each of these deterrent devices has its limitations. In such devices' operation, persons, pets, and other objects are capable of setting off such devices, making the operation of the device a nuisance to the property owner and neighbors.

U.S. Pat. No. 5,009,192 and U.S. Pat. No. 5,458,093 utilize a spray of water to scare off animals, but such devices necessitate time, trouble, labor and cost of running water lines to the area needing protection. Further, water lines are subject to freeze damage in winter, which is a time when much animal damage occurs, and repeatedly spraying foliage with water invites disease problems in plants. A further limitation of such devices is that they may also be activated by people or pets who might periodically enter the designated area, which can aggravate a property owner, visitors to the property, or laborers working on the property.

Other devices utilize heat and motion sensors that activate sound recordings of dogs barking. Wild animals, such as deer, typically habituate to such sounds. In other words, over time, the wildlife becomes used to such sounds as it learns that there is no physical threat associated with the sounds. U.S. Pat. No. 5,602,523 utilizes ultrasonic sounds to scare off deer and other wildlife, but such devices can also injure or harm pets and livestock.

U.S. Pat No. 5,892,446 utilizes a motion sensor to activate a radio and light source to scare off animals. The use of a radio ensures that the sound emanating from the device is continually changing, but such a device is disruptive to people, pets, and livestock due to the random nature of sounds emanating from the device at any time of day. In addition, it is still possible that wild animals will habituate to radio sounds, once they realize that there is no associated physical threat. Furthermore, these devices also have the limitation that light and sound are not necessarily the most effective methods to ward off wildlife, especially during daylight hours.

Therefore, there is a need for a device that is not only convenient to install and use, but that can be adapted and configured to deter different types of animals from designated areas without disturbing or disrupting working or sleeping persons, pets, or livestock. In all these regards, the present invention, in its various embodiments, substantially fulfills one or more of these needs.

SUMMARY OF THE INVENTION

Each embodiment of an apparatus in accordance with the present invention overcomes one or more of the disadvantages in the prior art. An apparatus in accordance with an embodiment of the invention comprises a timing mechanism controlling a toggle switch, a light source, a motor, and a signaling element. The timing mechanism activates and deactivates the light source and the motor via the toggle switch, and a user can adjust the timing mechanism to set the time intervals for activation and deactivation of the light source and motor. The signaling element, which may be configured as a flag in some embodiments, is mounted to the motor so that it can be driven thereby. In the case in which the motor drives the signaling element in a discontinuous on-off motion, the movement of the signaling element appears erratic to animals, which is effective in driving them away. In addition, in embodiments in which the signaling element is implemented as a flag with flexible material and staff, the waving motion accentuates the erratic behavior and more effectively drives animals away from the area. The light source is positioned relative to the signaling arm so as to illuminate the same upon its activation, which makes the movement of the signaling element more noticeable to animals, thus frightening them away. In some embodiments, the light source can be configured to generate light of a particular color effective to drive animals away. A colored filter or light bulb can be included in the light source for this purpose. Effective light colors include blue, red, and green, for example. The apparatus can comprise a housing or enclosure for mounting and protecting the above-mentioned elements. The apparatus can further comprise wheels and one or more skids to support the housing and enhance mobility of the apparatus so that it can be readily moved to an area for which protection from animals is desired. The apparatus can further comprise a handle for tilting the apparatus on its wheels and pushing or pulling the apparatus to or from the area to be protected. Some embodiments of the invention comprise a power source in the form of a battery, a solar panel or other generator, to provide power to the light source and motor. The power source can be mounted in the housing along with others of the above-mentioned elements. In alternative embodiments, the power source can be omitted and power instead be supplied through an extension cable via a conventional power outlet. In some embodiments where sounds emanating from the device would not be disruptive to persons, pets, or livestock, the apparatus can comprise a sound generator to make generate a sonic alarm to frighten off animals. In addition, because the running/resting times of the present invention can be adjusted, it is unlikely that wildlife will become habituated to the operation of the apparatus and that apparatus will become ineffective.

BRIEF DESCRIPTION OF THE DRAWINGS

The invention will be better understood and objects other than those set forth above will become apparent when consideration is given to the following description thereof. Such description makes reference to the following drawings.

DETAILED DESCRIPTION OF THE INVENTION

Figure 1:
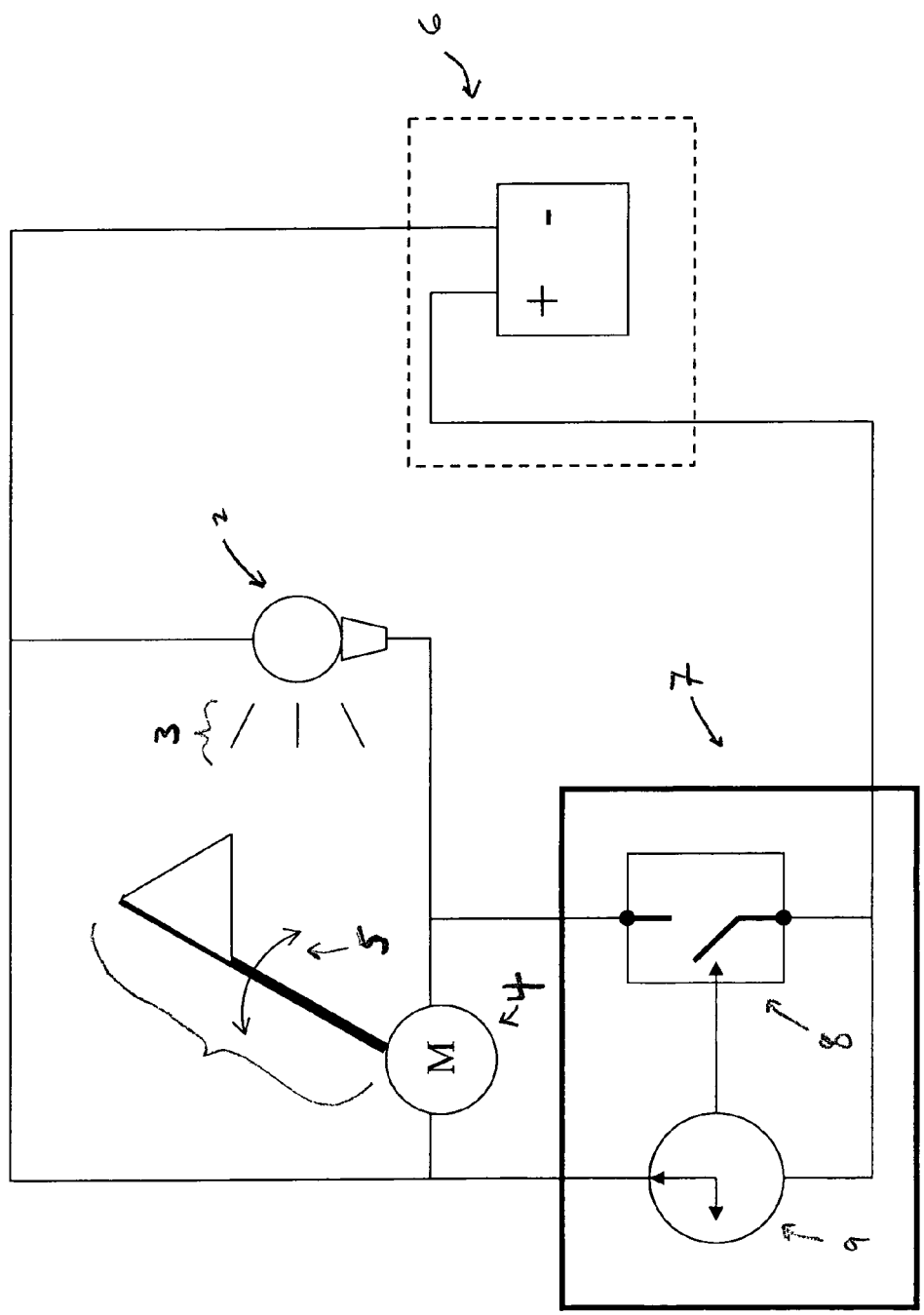
FIG. 1 is a circuit diagram illustrating how the various elements may be connected in an embodiment of an apparatus in accordance with the present invention.

With reference now to the drawings, a new apparatus for deterring animals from intruding into a designated area, which embodies the principles and concepts of the present invention, will be mainly described in terms of the embodiment of the invention shown in the accompanying drawings. However, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

A basic circuit diagram of an embodiment of an apparatus in accordance with the present invention is shown in FIG. 1. In its simplest form, the apparatus comprises a moving signaling element 1 and a light source 2, wherein the light source 2 is configured to project light 3 to illuminate the moving signaling element 1. The apparatus further comprises a motor 4 configured to cause the signaling element 1 to move in a direction of motion 5. The light source 2 and the motor 4 are powered by a power source 6. The apparatus is further comprised of a timer switch 7, comprised of a toggle switch 8 controlled by a timer mechanism 9.

In operation, the user, in order to scare off animals, needs only to place the apparatus in the location the user wishes to monitor. The user must then set the timing mechanism 9 accordingly and connect the power source 6 to the apparatus. Subsequently, at user designated time intervals, the timing mechanism 9 toggles the toggle switch 8, interrupting or completing the connection between the power source 6 and the light source 2 and the motor 4. Once the connection is complete, the power source 6 provides power contemporaneously to the light source 2 and the motor 4. This causes the motor 4 to cause the motion of the signaling element 1. Contemporaneously, the light source 2 will illuminate the moving signaling element 1. An animal in view of the apparatus will be alerted to the presence of the apparatus by the moving signaling element 1, by the light 3 from the light source 2, or a combination thereof. The motion of the signaling element 1 will elicit fear in the animal and cause the animal to leave the area. An animal may return to the area, but because the apparatus responds to input from the time mechanism 9 rather than some external input, the activation of the moving signaling flag appears random and threatening to an animal, causing the animal to leave the area temporarily or even permanently.

Figure 2:
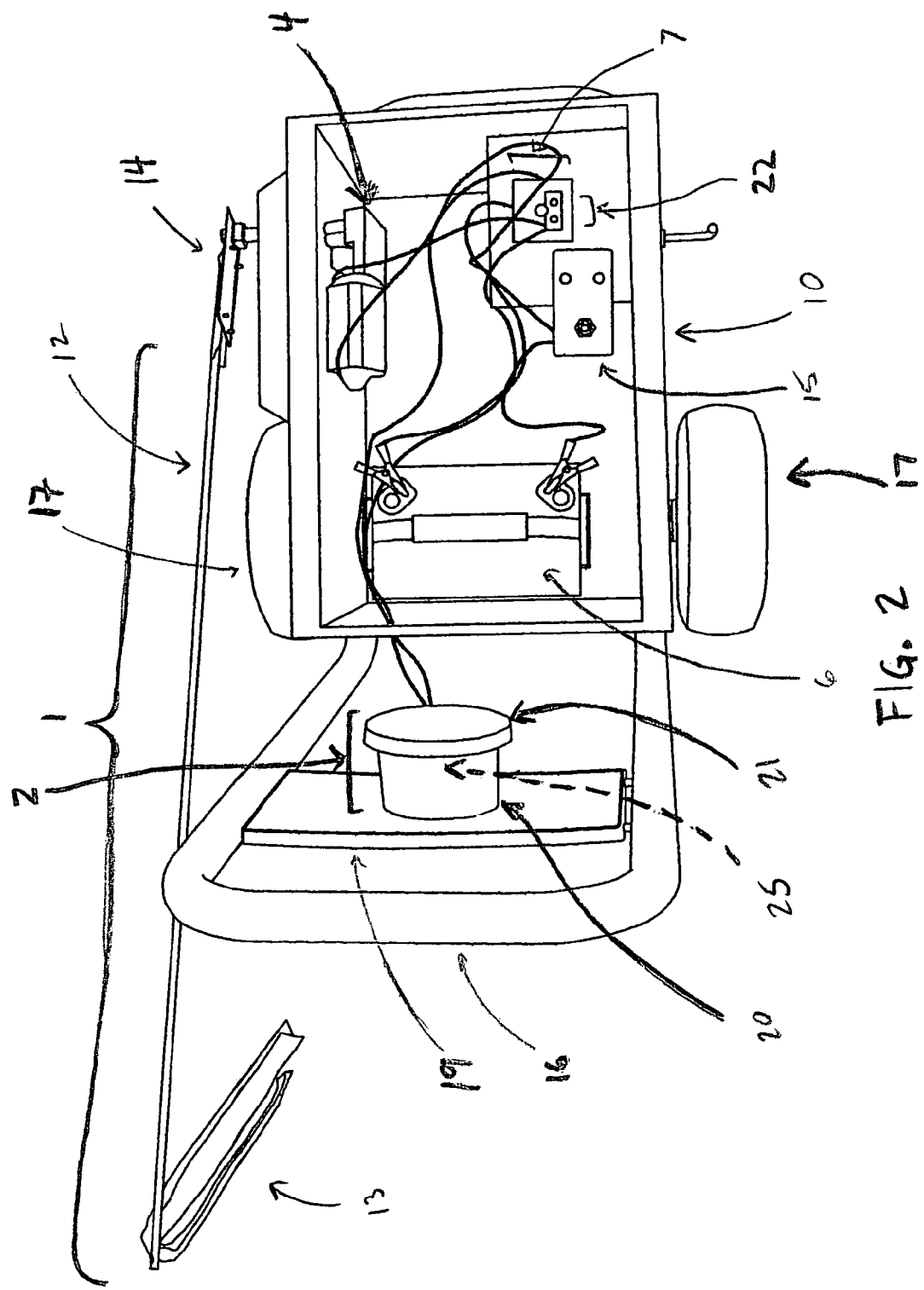
FIG. 2 is a top view of one embodiment of an apparatus in accordance with the present invention, showing the interior and exterior arrangement of the components according to that embodiment.
Figure 3:
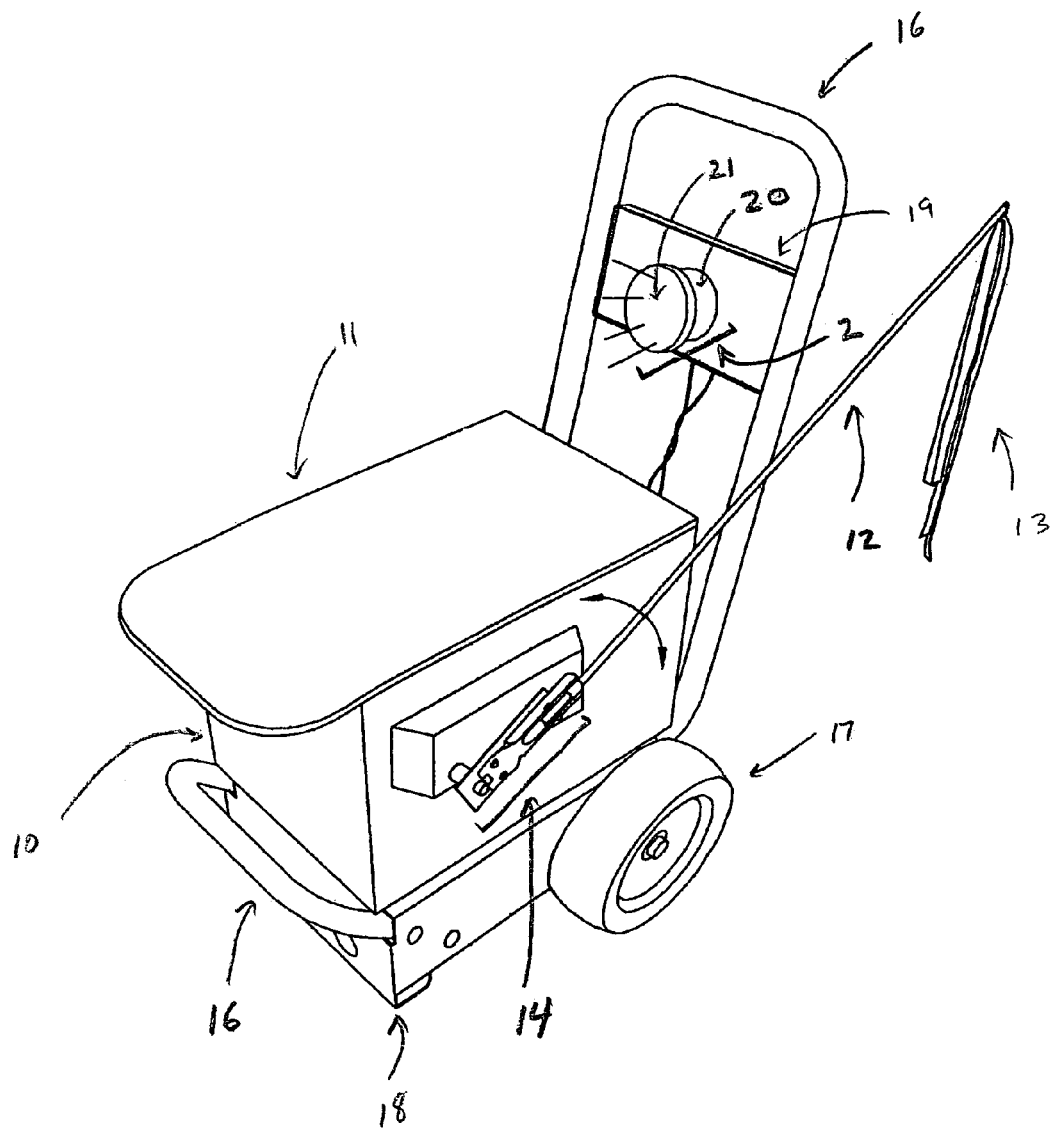
FIG. 3 is an off-axis view of one embodiment of an apparatus in accordance with the present invention, showing a lid covering an enclosure.

An apparatus in accordance with another embodiment of the present invention is shown in FIGS. 2-7. In this embodiment, the apparatus is further comprised of a housing or enclosure 10, used to house or mount the power source 6, the timer switch 7, and the motor 4. Furthermore, the motor 4 is mounted such that the signaling element 1 may be attached to the motor 4 on the outside of the enclosure 10, as shown in FIG. 2. This embodiment further comprises a removable lid 11, as shown in FIG. 3. Additionally, in this embodiment, the signaling element 1 is further comprised of a signaling arm 12 and a signaling device 13 attached to the end of the signaling arm 12. The apparatus further comprises a signaling element mounting device 14, used to connect the signaling arm 12 to the motor 4. The apparatus is also further comprised of a power switch 15, as shown in FIG. 2, wherein the power switch 15 is used to activate the timing mechanism 9 of the timer switch 7.

Figure 4:
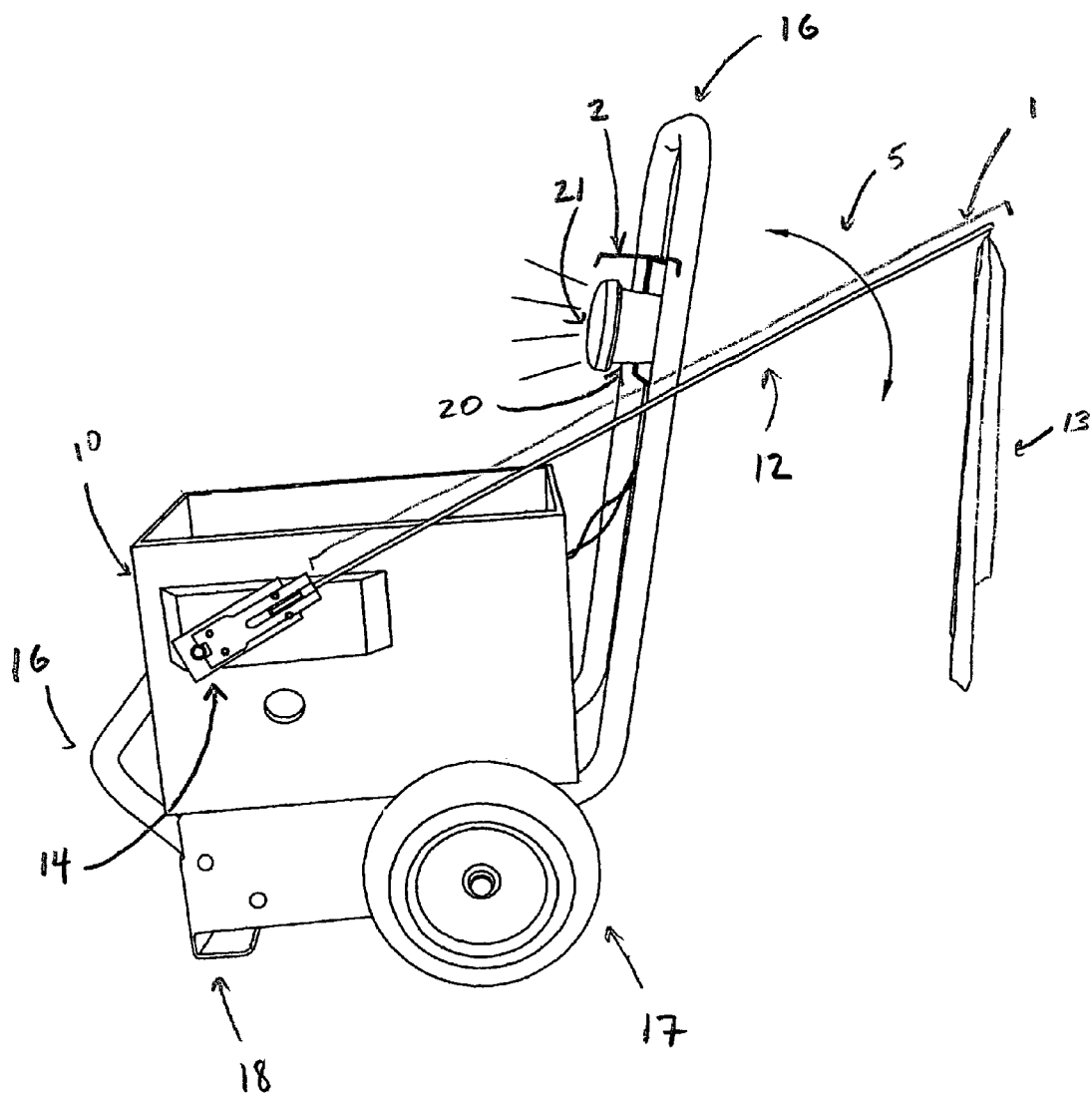
FIG. 4 is a side view of one embodiment of an apparatus in accordance with the present invention, showing the signal arm mounting device and the position of the skid and wheels.
Figure 5:
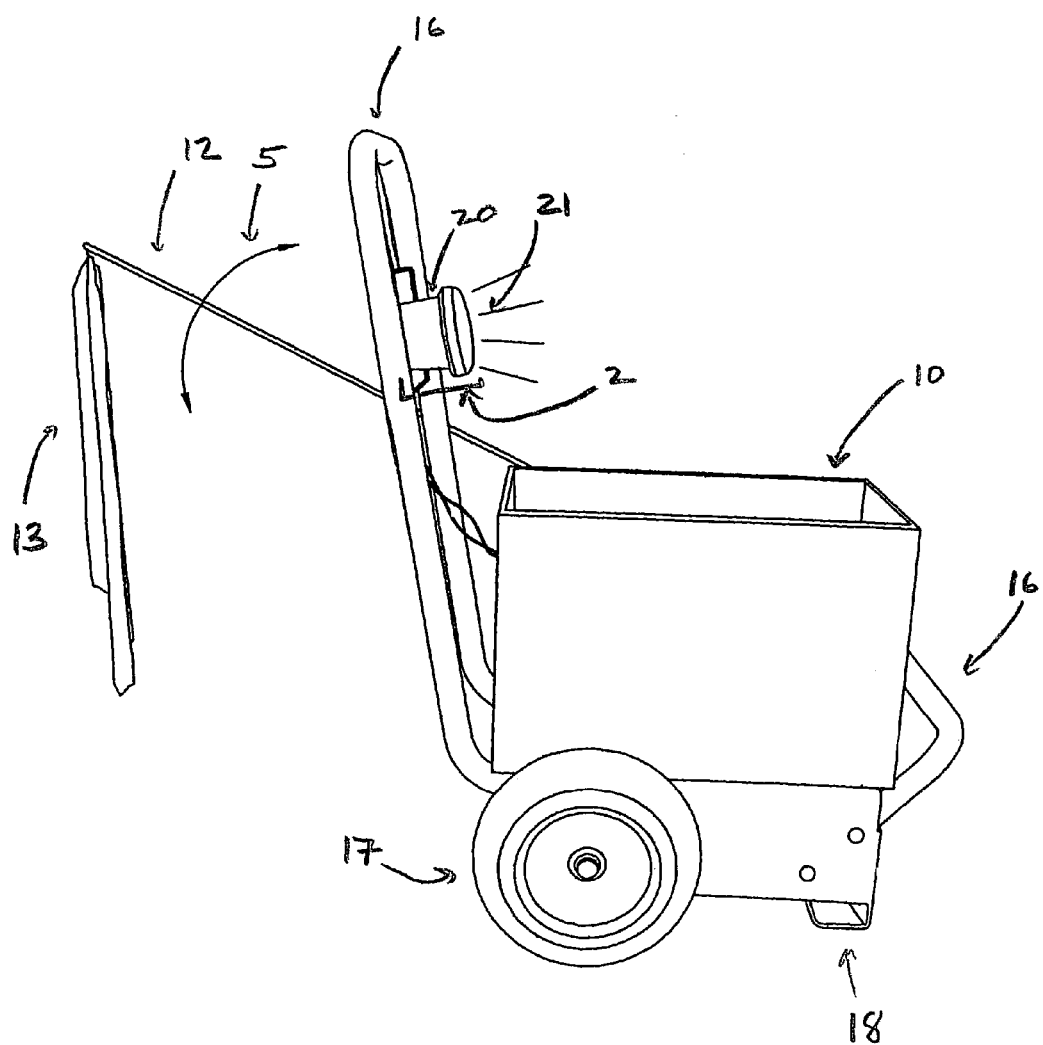
FIG. 5 is another side view of one embodiment of an apparatus in accordance with the present invention, showing the position of the skid and wheels.
Figure 6:
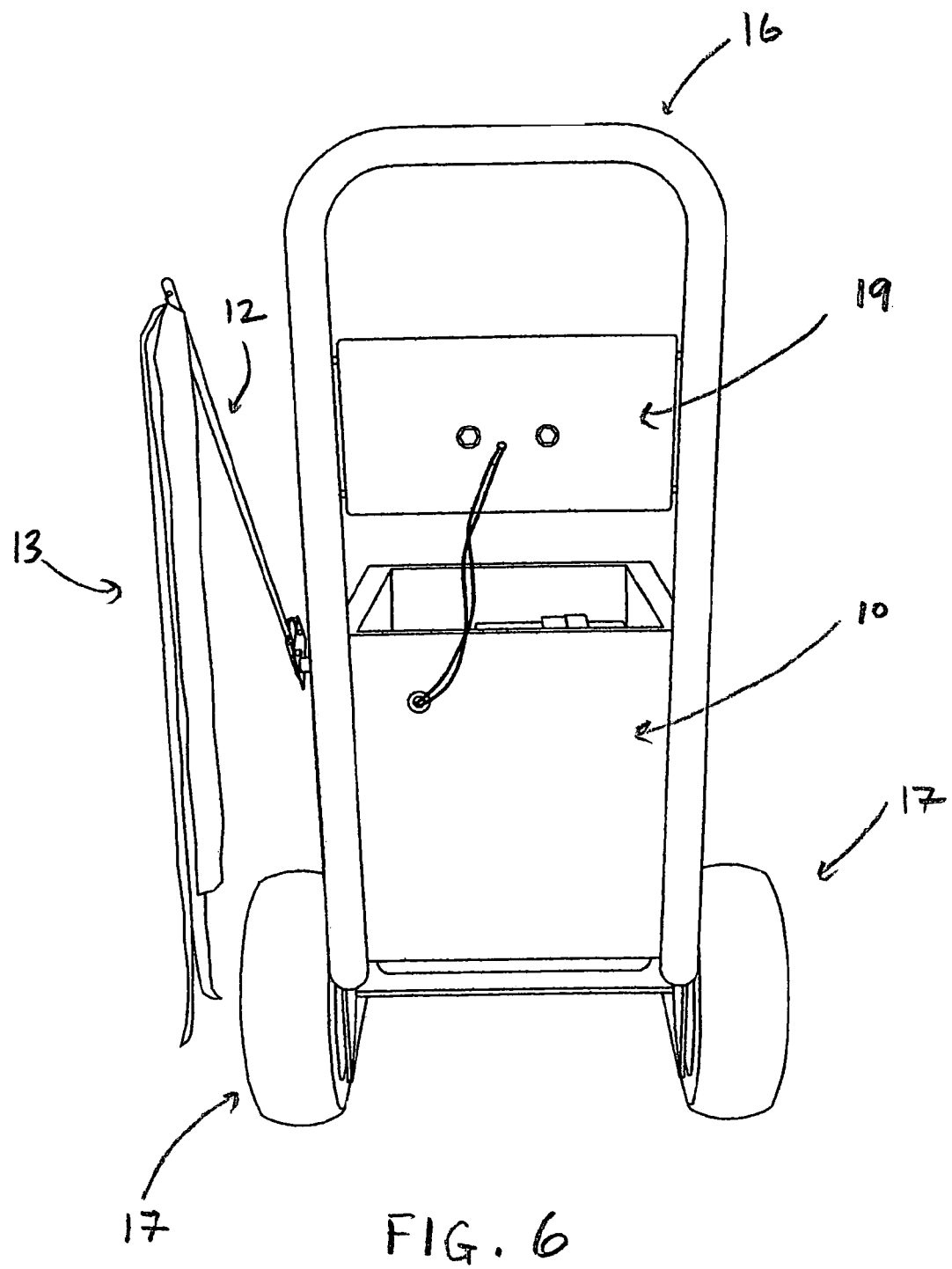
FIG. 6 is a rear view of one embodiment of an apparatus in accordance with the present invention, showing details of the electrical connections and mounting of the light source.
Figure 7:
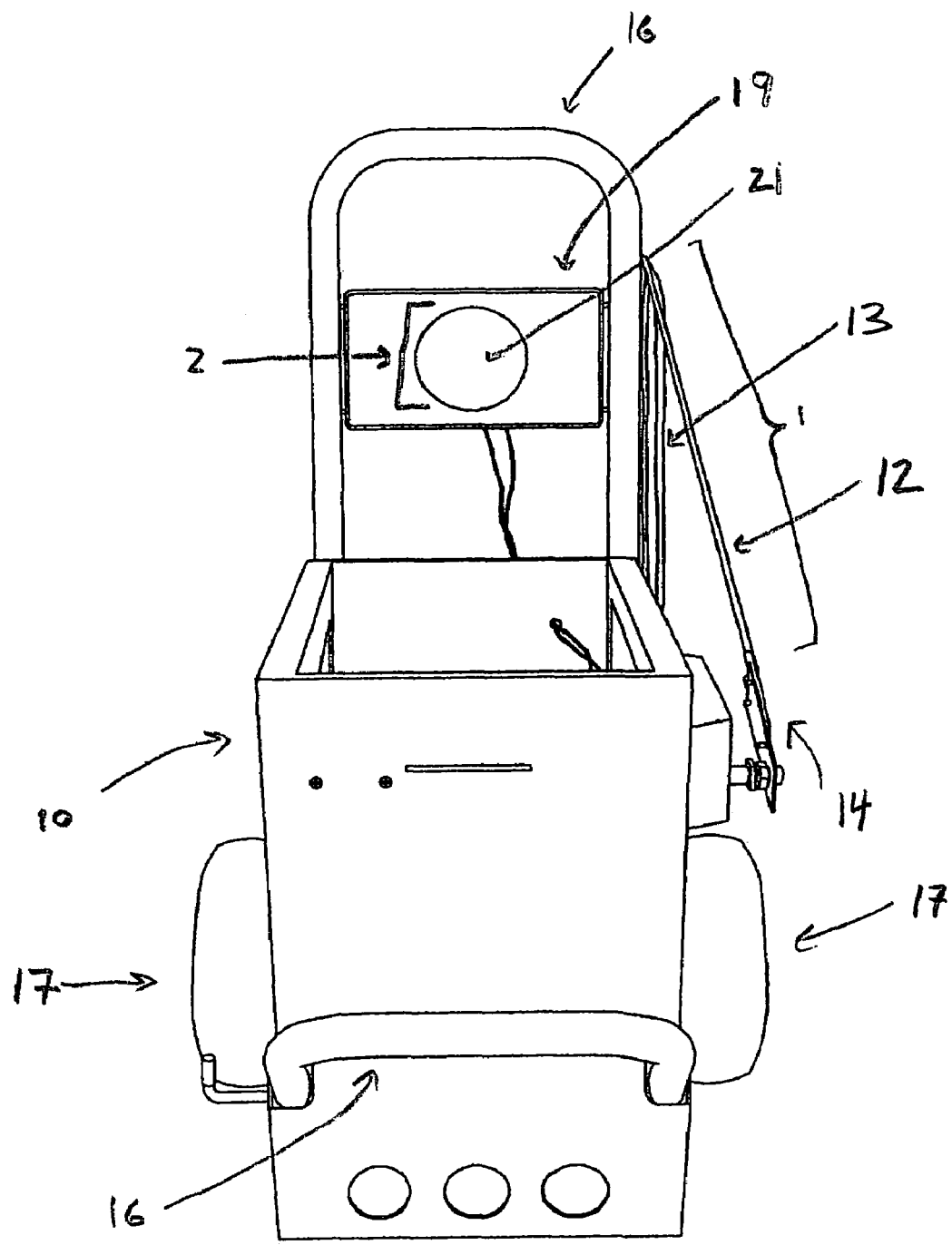
FIG. 7 is a front view of one embodiment of an apparatus in accordance with the present invention, further showing details of the electrical connections and mounting of the light source.

In this embodiment of the present invention, the apparatus is further comprised of a set of handles 16 and wheels 17. Additionally the apparatus further comprises a skid 18, as shown in FIGS. 3-5, to keep the apparatus level while not being transported. The apparatus is also further comprised of the light source 2 attached to a light source mounting plate 19, which is attached to a handle 16, as shown in FIG. 2-7. In this embodiment of the present invention, the light source 2 is further comprised of a light source housing 20, a lens 21, and a light bulb 25 (shown in dashed line in FIG. 2 to represent that it is positioned inside of the housing).

In this and other embodiments, the housing or enclosure 10 may be constructed in any number of ways. The materials comprising the enclosure 10 may be, but are not limited to, metal, plastic, wood, or any combination thereof. In this and other embodiments of the present invention, the enclosure 10 is comprised of approximately a 1'×1'×1' metal cube constructed from bent and welded sheet metal components. In other embodiments, the sides of a enclosure 10 may be constructed from separate pieces joined together in any way. Other embodiments of this invention may utilize other geometric shapes for the enclosure 10 other than a cube and the size of the enclosure 10 may vary. Additionally in this embodiment of the invention, as shown in FIG. 3, one of the sides of the enclosure 10, may be configured to be used as a lid 11. In other embodiments, access to the interior of the enclosure 10 may be accomplished through the use of a hinged panel or a partially or completely removable panel attached to the enclosure 10 designed to cover an opening in a side of the enclosure 10. In other embodiments, access to the interior of the enclosure 10 may also comprise of an opening in the side of the enclosure 10 without a covering. In this and other embodiments of the present invention, the enclosure 10 may be weatherproofed to protect the electrical components from any possible source of moisture, such as any form of precipitation or water from irrigation or sprinkler systems. In such embodiments, the access to the interior of the enclosure 10 may be weatherproofed as well to protect any enclosed electrical components.

In this and other embodiments of an apparatus in accordance with the present invention, the amount of countdown time until the apparatus activates may be adjusted as needed by the user. In the embodiment as shown in FIGS. 2-7, the countdown time is adjusted via a set of adjustment controls 22 located on the timer switch 7, as shown in FIG. 2. In this and other embodiments of the invention, the timer switch 7 may separately control both the amount of time the apparatus is activated and the amount of time the apparatus is deactivated. A timer switch 7 suitable in such embodiments is the ABB SSAC, Inc. Recycling KRDR Series Digi-Time Time Delay Relay. Through repeated experimentation, a run time of 10 seconds for the apparatus and a time delay of at least 4 minutes before the apparatus is reactivated have been shown to be the most effective time settings for the deterrence of deer and most other wildlife. However, in other embodiments of the invention, the timer switch 7 may consist of any mechanical, electronic, or other type of time controlled switch mechanism. Additionally, in some embodiments, these controls may be adjusted from the outside of the enclosure 10 via some type of wired or wireless connection to a control device or control panel attached to the enclosure of the apparatus.

In this and other embodiments, the motor 4 is activated by the timer switch 7, causing the signaling element 1 to move. In the embodiment as shown in FIGS. 2-7, the motor 4 is further comprised of a single speed or a dual speed windshield wiper motor, available from auto parts dealers. In general, wildlife is most effectively repelled by irregular or variable back and forth motion as opposed to smooth motions, to which wildlife can habituate. Windshield wiper motors are available for relatively low cost and are effective in providing such irregular motion. However, in other embodiments of the present invention, other types of motors can be configured to generate motion of signaling elements capable of scaring off animals.

In this and other embodiments, as shown in FIGS. 2-7, the signaling element 1 is further comprised of a signaling arm 12 and a signaling device 13, further comprised of a set of streamers or ribbons. In this and other embodiments, the signaling arm 12 may be comprised of any material, including fiberglass, wood, or metal, such as in a bicycle or boat flagpole. In embodiments where the signaling arm 12 is comprised of a flexible material, the added flexing of the signaling arm 12 may enhance the motion and effectiveness of the signaling device 13. Additionally, in other embodiments, the signaling device 13 may be comprised of one or more banners, pennants, flags, or any other type of visual signaling devices. In some embodiments, the signaling device 13 may be comprised of a piece of rope, string, twine, or other type of line, with multiple visual signaling devices attached, to facilitate monitoring of large areas.

In other embodiments, the signaling device may also comprise a bell, a whistle, a chime, or other device capable of generating sounds audible to wildlife upon the motion of the signaling arm 12. Other embodiments of the invention may use the signaling arm 12 to strike a surface to make a sound as the motor 4 operates. In these embodiments, sound may be generated by placing the apparatus next to a tree or other hard surface, so that surface lies in motion path 5, and sound is generated by the act of the signaling arm 12 striking the surface.

Other embodiments of the invention may use a multiple number of signaling elements 1 which could be operated by a single motor 1, or by using multiple signaling elements 1 on multiple motors 4.

In this and other embodiments, as shown in FIGS. 2-7, a set of wheels 17 and handles 16 are attached to the enclosure 10 to allow an individual to easily transport the apparatus. In this and other embodiments utilizing only 2 wheels, an oppositely placed skid 18 may be used to support the apparatus, as shown in FIGS. 3-5. In other embodiments, an additional set of wheels may be used in lieu of the skid 18. In other embodiments, a set of skis, a sled, or other sliding device may be used instead of wheels 18. In other embodiments, it may be sufficient to only have handles 16 or wheels 17, not both. In other embodiments, the size of the apparatus may be small enough not to require any additional means to transport the apparatus. In other embodiments, larger components, such as the signaling element may be easily removable to facilitate transport of the apparatus.

In this and other embodiments, as shown in FIGS. 2-7, a light source mounting plate 19, attached to the handle 16, is used to support the light source 2. However, in other embodiments, the light source 2 may be attached directly to the enclosure 10. In other embodiments, the light source 2 may be separate from the enclosure 10, allowing the user to place the light source 2 as needed to illuminate the signaling element 1.

In this and other embodiments of the present invention, as shown in FIGS. 1-6, the light source 2 activates contemporaneously with the motor 4. In the embodiment shown in FIGS. 2-6, the light source 2 comprises a 12 volt automotive turn signal bulb in an automotive light bulb housing 20, both available at any auto parts store. However, in this and other embodiments of the present invention, any source of light, such as incandescent bulbs, fluorescent bulbs, light emitting diodes, other light sources not listed, or any combination thereof may also be utilized to comprise the light source. Additionally, in other embodiments of the present invention, any other type of light bulb housing 20 could be utilized and such a light bulb housing 20 could be weatherproofed as well to protect the enclosed electrical components.

Additionally, in this and other embodiments of the present invention, as shown in FIGS. 2-7, the apparatus may utilize a colored lens 21 to filter the light 3 from the light source 2, which may be used to more effectively alert certain types of wildlife. In this embodiment, blue, red, or green colored lenses 21 have been found to be the most effective in startling wildlife. Alternatively, in other embodiments, a colored light bulb could be used to provide the color of light 3 desired. In other embodiments of the present invention, other colors of light 3 may be similarly effective or more effective.

In this and other embodiments of the invention, as shown in FIGS. 2-7, the power source 6 comprises a battery which powers the timer switch 7 via a power switch 15. However, in other embodiments of the present invention, the apparatus may be powered on by manually connecting the power source to the timer switch 7. In other embodiments, ordinary household current, solar power, or a battery charged by solar power or household current may be used as a power source. Other embodiments of the present invention could potentially use any source of electricity. Other embodiments may require the use of a transformer, depending on whether direct current or alternating current components are used.

In operation, to scare off deer and most wildlife, a user must first transport the apparatus to the area desired to be monitored. In this and other embodiments, as shown in FIGS. 2-7, the apparatus comprises a cart, requiring the user to simply tilt and roll the apparatus, like a dolly, to the desired location. In this and other embodiments, once the apparatus is placed in the desired location, the user must open the lid 11 and power the timer switch 7 by utilizing the power switch 15. Alternatively, before powering the timer switch 7, the user may adjust the adjustment controls 22 on the timer switch 7. In this and other embodiments, as shown in FIGS. 2-7, once the timer switch 7 is powered, it begins counting down the time as set by the adjustment controls 22 on the timer switch. Once the set time interval passes, the timer switch 7 toggles to the "on" position, powering the motor 4 and the light source 2. Contemporaneously, the light source illuminates the signaling element 1. Through repeated experimentation, it has been shown that an animal within 600-800 feet of the apparatus shown in FIGS. 2-7 will be alerted to the presence of the apparatus by the light source 2 or the signaling element 1. In embodiments where the motor 4 is comprised of a windshield wiper motor, the animal will see the illuminated signaling element 1 swaying back and forth in the jarring motion typical of the windshield wiper motor, become fearful, and depart the area. In this and other embodiments, the blue, green, or red lens 21 makes the light 3 from the light source 2 more visible to wildlife and may be used to enhance the illumination of the signaling element 1. Once the set time interval passes, the timer switch 7 toggles to the "off" position, deactivating the motor 1 and the light source 2. An animal may then re-enter the area, but will be startled again once the apparatus re-activates in a seemingly random fashion. The animal, unsure of the threat will then choose not to re-enter the area.

In another embodiment of the present invention, operative to scare off geese and other fowl over a large area, the apparatus shown in FIGS. 2-7 may be placed and activated as described above. However, a long rope or other type of line may also attached to the end of the signaling arm 12 and at least one other support point, such as a tree. The rope may have multiple signaling devices 13 attached to it. Once the apparatus activates, the entire rope moves contemporaneously with the signaling arm 12 and operates as a signaling device 13 to scare off the fowl. Once the set time interval passes, the timer switch 7 toggles to the "off" position, deactivating the motor 4 and the light source 2. Fowl may then re-enter the area, but will be startled again once the apparatus re-activates in a seemingly random fashion. The fowl, unsure of the threat will then choose not to re-enter the area.

In another embodiment of the present invention, operative to scare off beaver, the apparatus is placed against the trunk of a tree or other hard surface, such that the signal arm will strike the trunk. Once activated, the signaling arm 12 will strike the trunk, generating a sound. The beaver hearing the sound are startled. Again because of the seemingly random activation of the apparatus and the sounds created, the beaver may then re-enter the area, but will be startled again once the apparatus re-activates in its seemingly random fashion. The beaver, unsure of the threat will then choose not to re-enter the area.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered illustrative only of the principles of the invention. Further, since numerous modifications and changes will readily occur to those skilled in the art, it is not desired to limit the invention to exact construction and operation described and accordingly, and all suitable modifications and equivalents may be resorted to, falling within the scope of the invention.

What is claimed is:

1. An animal deterrent device comprising:
   an enclosure;
   an electrically-powered windshield wiper motor within said enclosure wherein said motor operates to move the position of said signaling element in a variable back and forth motion between two positions;
   a signaling element connected to be moved in an variable back and forth waving motion swaying back and forth by the motor, said signaling element comprised of a signaling arm and a visual signaling device, wherein said visual signaling device comprises a flag having a flexible material and flexible staff;
   a light source positioned to illuminate the variable back and forth waving motion of the signaling element with a colored light, wherein said colored light is selected from the group consisting of blue colored light, green colored light, and red colored light;
   a timer switch connected to the motor and light source, said timer switch activating and deactivating said motor and said light source at time intervals set by said timer switch, wherein said timer switch further comprises a timing mechanism, wherein said timing mechanism has a first setting to regulate the amount of time that must elapse before said light source and said motor activate and a second setting to regulate the amount of time that must elapse before said light source and said motor deactivate, and wherein said timing mechanism has a first setting to regulate the amount of time that must elapse before said light source and said motor activate and a second setting to regulate the amount of time that must elapse before said light source and said motor deactivate;
   a skid connected to said enclosure;
   a power switch operating to connect and disconnect a power supply through an extension cable via a conventional power outlet;
   two or more wheels connected to said enclosure; and,
   a handle connected to said enclosure to enable the animal deterrent device to be tilted on said two or more wheels, said handle comprising a light source mounting plate for mounting said light source.

2. The animal deterrent device of claim 1, wherein said sound generating means comprises a sound generating device which generates a sound when struck by the signaling arm.

3. The animal deterrent device of claim 1, wherein said signaling element further comprises a sound generating device.

* * * * *